United States Patent
Baker (10) Patent No.: US 10,721,866 B2
(45) Date of Patent: Jul. 28, 2020

(54) WALK BEHIND LAWN MOWER WITH A COLLECTOR DUMP ASSEMBLY

(71) Applicant: HUSQVARNA AB, Huskvarna (SE)

(72) Inventor: David Baker, Fort Lawn, SC (US)

(73) Assignee: HUSQVARNA AB, Huskvarna (SE)

( * ) Notice: Subject to any disclaimer, the term of this patent is extended or adjusted under 35 U.S.C. 154(b) by 338 days.

(21) Appl. No.: 15/574,579

(22) PCT Filed: May 17, 2016

(86) PCT No.: PCT/IB2016/052869
§ 371 (c)(1),
(2) Date: Nov. 16, 2017

(87) PCT Pub. No.: WO2016/185383
PCT Pub. Date: Nov. 24, 2016

(65) Prior Publication Data
US 2018/0160625 A1   Jun. 14, 2018

Related U.S. Application Data

(60) Provisional application No. 62/162,974, filed on May 18, 2015.

(51) Int. Cl.
*A01D 43/063* (2006.01)

(52) U.S. Cl.
CPC ....... *A01D 43/0635* (2013.01); *A01D 43/063* (2013.01)

(58) Field of Classification Search
CPC .............. A01D 43/0635; A01D 43/063; A01D 43/0638; A01D 43/0631; A01D 43/0636; A01D 34/49; A01D 34/71; A01D 34/067
See application file for complete search history.

(56) References Cited

U.S. PATENT DOCUMENTS

| 1,439,806 A | 11/1890 | Miller |
| 2,592,445 A | 2/1902 | Hoffmann |

(Continued)

FOREIGN PATENT DOCUMENTS

| CN | 204131982 U | 2/2015 |
| EP | 0172295 B1 * | 10/1988 | ......... A01D 43/0631 |

(Continued)

OTHER PUBLICATIONS

International Search Report and Written Opinion for International Application No. PCT/IB2016/052869 dated Oct. 19, 2016.

(Continued)

*Primary Examiner* — Thomas B Will
*Assistant Examiner* — Joan D Misa
(74) *Attorney, Agent, or Firm* — Burr & Forman, LLP (57) ABSTRACT

A lawn mower may include a blade housing configured to house at least one blade, an engine operably coupled to the blade housing and configured to selectively rotate the at least one blade, a handle bracket assembly operably coupled to the blade housing, a handle assembly operably coupled to the handle bracket assembly, a door operably pivot about a first pivot axis and a collector operably coupled to the handle bracket assembly and configured to coupled to the handle bracket assembly and configured to pivot about a second pivot axis between a first position and a second position. In the first position, the collector is configured to receive clippings generated responsive to operation of the at least one blade. In the second position, the collector is configured to dump the clippings from the collector. The door is biased against the collector to maintain a portion of the collector substantially at the second pivot axis as the collector pivots between the first position and the second position.

18 Claims, 5 Drawing Sheets

(56) References Cited

U.S. PATENT DOCUMENTS

| | | | |
|---|---|---|---|
| 875,056 A | 12/1907 | Fergesen | |
| 2,882,670 A * | 4/1959 | Stephens | A01D 43/063 56/194 |
| 3,636,686 A * | 1/1972 | Meyer | A01D 34/49 56/320.2 |
| 3,694,855 A * | 10/1972 | Meyer | A01D 34/49 16/437 |
| 3,757,503 A * | 9/1973 | Soldavini | A01D 43/063 56/202 |
| 4,064,680 A * | 12/1977 | Fleigle | A01D 34/82 56/11.9 |
| 4,399,647 A * | 8/1983 | Soldavini | A01D 43/063 56/202 |
| 4,478,031 A | 10/1984 | Wolf | |
| 4,512,144 A * | 4/1985 | Soldavini | A01D 43/063 56/202 |
| 4,637,203 A | 1/1987 | Fedeli | |
| 5,906,088 A | 5/1999 | Inui et al. | |
| 6,018,937 A * | 2/2000 | Shimada | H01R 13/44 56/10.5 |
| 6,490,851 B2 * | 12/2002 | Kutsukake | A01D 43/063 56/202 |
| 6,694,716 B1 * | 2/2004 | Osborne | A01D 43/063 56/202 |
| 6,698,173 B2 * | 3/2004 | Joseph | A01D 34/001 56/11.3 |
| 6,705,068 B2 * | 3/2004 | Iida | A01D 34/826 56/202 |
| 6,735,930 B2 * | 5/2004 | Sugiyama | A01D 43/063 56/202 |
| 7,013,627 B2 * | 3/2006 | Hebbard | A01D 43/063 56/202 |
| 7,806,593 B2 * | 10/2010 | Toporski | A01D 43/063 383/1 |
| 7,866,134 B2 * | 1/2011 | Lambert | A01D 43/063 |
| 8,578,691 B2 * | 11/2013 | Lahey | A01D 34/71 56/202 |
| 8,850,782 B2 * | 10/2014 | Haraqia | A01D 34/828 56/16.9 |
| 8,857,142 B2 * | 10/2014 | Lahey | A01D 34/71 56/202 |
| 9,386,743 B2 * | 7/2016 | Baker | A01D 34/824 |
| 9,414,539 B2 * | 8/2016 | Lahey | A01D 34/71 |
| 9,491,907 B2 * | 11/2016 | Edholm | A01D 34/824 |
| 2002/0084117 A1 | 7/2002 | Joseph | |

FOREIGN PATENT DOCUMENTS

| | | | | |
|---|---|---|---|---|
| EP | 1386530 A1 * | 2/2004 | | A01D 34/71 |
| EP | 3141098 A1 * | 3/2017 | | A01D 34/71 |
| FR | 2742300 A1 | 6/1997 | | |
| JP | H03133308 A | 6/1991 | | |
| JP | H04210513 A | 7/1992 | | |
| JP | H0994023 A | 4/1997 | | |
| WO | 2010085258 A1 | 7/2010 | | |

OTHER PUBLICATIONS

Abletotech Corporation,"Get a cutting edged solution to an old problem", accessed at http://www.abletotech.com/, accessed on Jan. 20, 2015.

Green Works, "16-Inch Reel Mower,Suitable for medium sized gardens", accessed at http://www.greenworkstools.com/lawn-garden/mowers/16-reel-mower/, accessed on Jan. 20, 2015.

RC Sekacky,"Radio Controlled Lawn Mower", accessed at http://www.rcsekacky.cz/eng1.html , accessed on Jan. 20, 2015.

* cited by examiner

WALK BEHIND LAWN MOWER WITH A COLLECTOR DUMP ASSEMBLY

CROSS REFERENCE TO RELATED APPLICATIONS

This application claims the benefit of U.S. Provisional Application Ser. No. 62/162,974 filed on May 18, 2015, the entire contents of which are hereby incorporated herein by reference.

TECHNICAL FIELD

Example embodiments generally relate to outdoor power equipment and, more particularly, relate to a walk behind lawn mower having a grass collector and configured to dump the contents of the grass collector without removing the grass collector from the lawn mower.

BACKGROUND

Yard maintenance tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically relatively compact, have comparatively small engines and are relatively inexpensive. Meanwhile, at the other end of the spectrum, riding lawn mowers, such as lawn tractors, can be quite large. Riding lawn mowers can sometimes also be configured with various functional accessories (e.g., trailers, tillers and/or the like) in addition to grass cutting components. Riding lawn mowers can also be ruggedly built and have sufficient power, traction, and handling capabilities to enable operators to mow over rough terrain, if needed.

Walk behind models are often used when smaller lots or tighter areas are to be mowed. Some, relatively simple walk behind models may move responsive only to the pushing force provided by the operator. However, other models may provide power to the wheels to assist the operator relative to providing mobility for the lawn mower. In either case, the operator typically controls the lawn mower and/or pushes the lawn mower via a handle assembly that extends rearward and upward behind the lawn mower to allow the operator to engage the handle assembly while walking behind the lawn mower.

For some walk behind models, grass collectors are attached in order to collect the clippings generated by operation of the mower. These grass collectors need emptying when they have filled up, and such emptying is typically accomplished by removing the collectors to dump them out. In some cases, the position of a door that covers the mower discharge when the collector is removed or the position of the handle may make it difficult to access, remove or replace the collector. Accordingly, it may be desirable to develop improved ways to achieve dumping of a grass collector.

BRIEF SUMMARY OF SOME EXAMPLES

Some example embodiments may therefore provide for improved lawn mower design by providing a collector that can be easily emptied. For example, some embodiments may provide a collector bracket assembly to allow the collector to be pivoted for dumping or emptying of the collector without requiring the collector to be removed. Such dumping can therefore be easily handled by rotating the handles forward (e.g., to an upright position) or by manually lifting the collector. Some example embodiments may provide for improving the operator experience relative to the ease of use and convenience associated with emptying clippings of the lawn mower and overall operability of the lawn mower.

In an example embodiment, a lawn mower may be provided. The lawn mower may include a blade housing configured to house at least one blade, an engine operably coupled to the blade housing and configured to selectively rotate the at least one blade, a handle bracket assembly operably coupled to the blade housing, a handle assembly operably coupled to the handle bracket assembly, a door operably coupled to the handle bracket assembly and configured to pivot about a first pivot axis and a collector operably coupled to the handle bracket assembly and configured to pivot about a second pivot axis between a first position and a second position. In the first position, the collector is configured to receive clippings generated responsive to operation of the at least one blade. In the second position, the collector is configured to dump the clippings from the collector. The door is biased against the collector to maintain a portion of the collector substantially at the second pivot axis as the collector pivots between the first position and the second position.

In still another example embodiment, a collector dump assembly for dumping a collector attachable to a lawn mower is provided. The collector dump assembly may include a handle bracket assembly and a collector. The handle bracket assembly may be operably coupled to a blade housing, a door, and a handle assembly of the lawn mower. The door is configured to pivot about a first pivot axis. The collector may be operably coupled to the handle bracket assembly and configured to pivot about a second pivot axis between a first position and a second position. In the first position, the collector is configured to receive clippings generated responsive to operation of the at least one blade. In the second position, the collector is configured to dump the clippings from the collector. The door is biased against the collector to maintain a portion of the collector substantially at the second pivot axis as the collector pivots between the first position and the second position.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Figure 1:
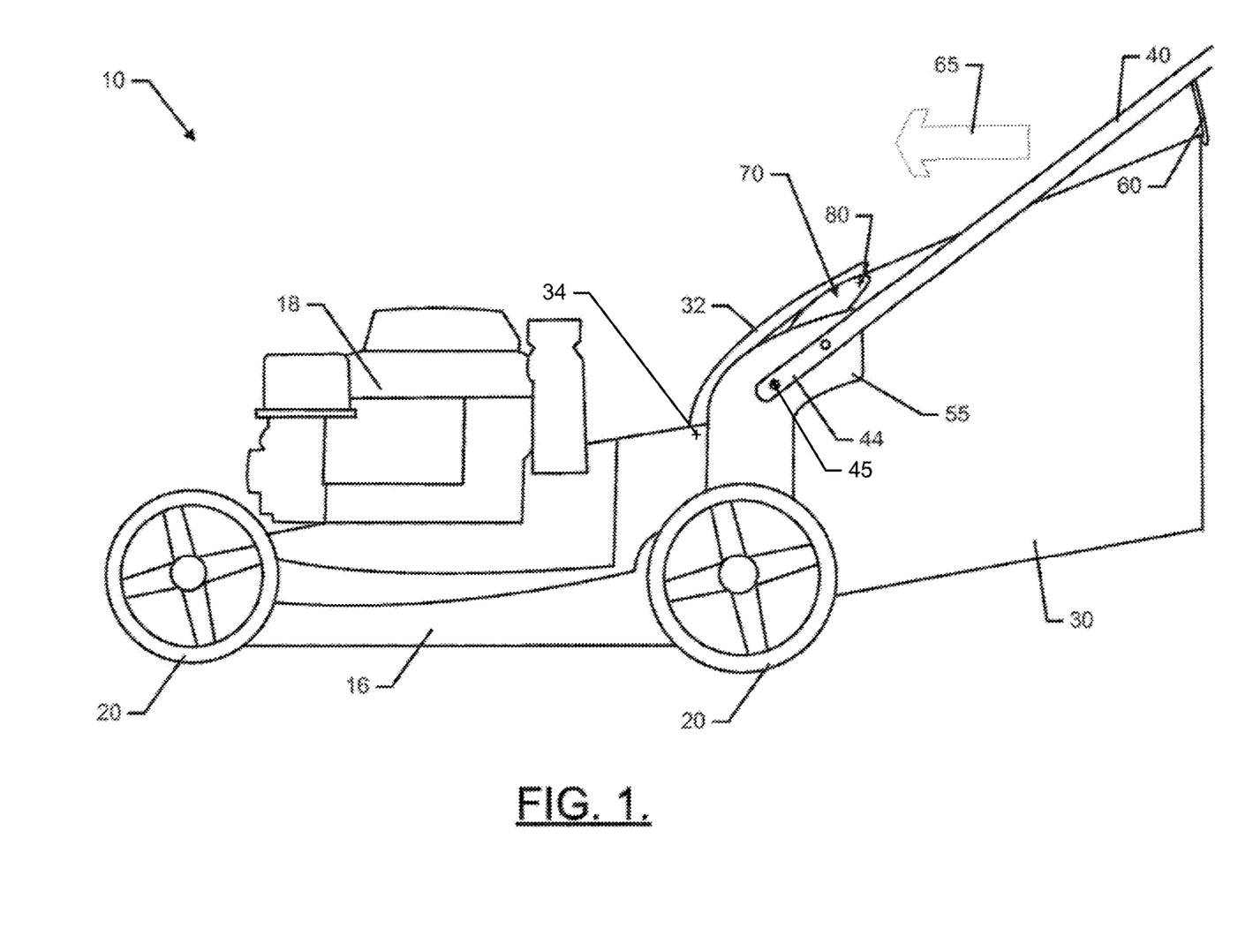
FIG. 1 illustrates a side view of a walk-behind lawn mower having a collector dump assembly according to an example embodiment.

FIG. 1 illustrates a side view of a walk-behind lawn mower 10 of an example embodiment. However, it should be appreciated that the walk-behind lawn mower 10 is just one example of an outdoor power equipment device on which an example embodiment may be practiced. In other examples, the outdoor power equipment device could be a trimmer, edger, tiller, snow thrower and/or the like. An operator may be located at an operator location behind the lawn mower 10. The lawn mower 10 of FIG. 1 includes a blade housing 16 that may house a rotatable cutting blade (not shown). The cutting blade may be suspended above the ground at the end of a rotatable shaft (e.g., a drive shaft—again not shown in FIG. 1) that may be turned responsive to operation of an engine 18, such as a gasoline powered engine or an electric motor. Operation of the engine 18 may be initiated by a recoil starter via pulling of a recoil starter handle by the operator. However, in other embodiments, the engine 18 may alternatively be started via a key, switch, electronic ignition or other similar device.

The lawn mower 10 may include a mobility assembly on which a substantial portion of the weight of the lawn mower 10 may rest when the lawn mower 10 is stationary. The mobility assembly may also provide for movement of the lawn mower 10. In some cases, the mobility assembly may be driven via power from the engine 18 that may be selectively provided to ground engaging wheels 20, which make up the mobility assembly.

In some examples, the ground engaging wheels 20 may be adjustable in their respective heights. Adjusting the height of the front wheels and/or the back wheels may be employed in order to provide a level cut and/or to adjust the height of the cutting blade. In some embodiments, a local wheel height adjuster may be provided at the front wheels and/or the back wheels. However, in other embodiments, remote wheel height adjustment may also or alternatively be possible.

Rotation of the cutting blade (e.g., in a plane substantially parallel to the ground) may generate grass clippings, and/or other debris that may be ejected from the blade housing 16. In some cases, the clippings/debris may be ejected from a side or rear of the blade housing 16. When a rear discharge is employed, many such lawn mowers may employ a collector 30 to collect discharged clippings/debris. However, collectors may also be used for side discharge models in some cases. The collector 30 may be removable to enable the operator to empty the collector 30, and the collector 30 may be made of fabric, plastic or other suitable materials. In an example embodiment, a rear door 32 may be provided to mate with the collector 30 when the lawn mower 10 is ready to cut grass with the collector 30 attached, and to at least partially close off the rear of the blade housing 16 for operation without the collector 30.

Figure 3:
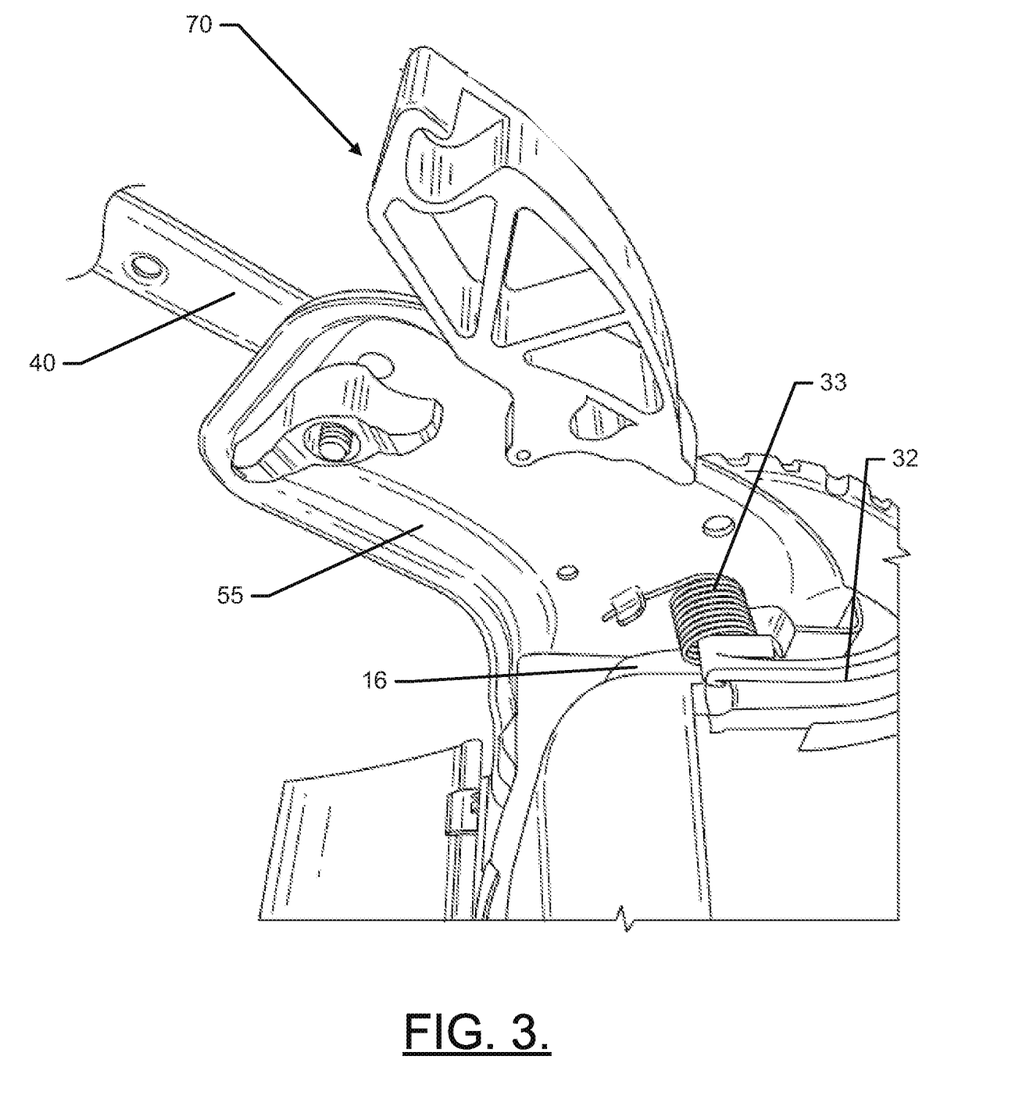
FIG. 3 illustrates a perspective view of a biasing member for biasing a door of the walk-behind lawn mower according to an example embodiment.

The door 32 may be hingedly attached to a handle bracket assembly and/or the blade housing 16 above and proximate to the rear discharge in order to drop down and at least partially cover the rear discharge if the collector 30 is removed for any reason. The collector 30 may interface with the blade housing 16 at the rear discharge and the door 32 to provide a relatively tight seal so that the clippings ejected through the rear discharge are captured in the collector 30. As such, the door 32 may extend over at least a portion of the collector 30. The door 32 may, in some cases, be biased toward engagement with the blade housing 16 (e.g., to cover the rear discharge) by a biasing member 33 (e.g., a spring) as shown in FIG. 3. The biasing member 33, if provided, may urge the door 32 to rotate toward the rear discharge and/or the blade housing 16 by pivoting the door about a first pivot axis 34.

In an example embodiment, the lawn mower 10 may further include a handle assembly. The handle assembly of FIG. 1 may include two handle members 40 (only one of which is visible in the side view of FIG. 1) that extend generally rearward and upward from opposing sides of a rear portion of the blade housing 16. The handle members 40 may be substantially parallel to each other and may be connected to each other at their distal ends via a cross bar that may form an additional portion of the handle assembly. A proximal end 44 of the handle members 40 may engage or otherwise be operably coupled to the lawn mower 10 (e.g., to the blade housing 16 or to a handle bracket assembly that is operably coupled to the blade housing 16). Thus, the terms distal and proximal should be understood to be used in reference to the blade housing 16 or engine 18 of the lawn mower 10.

The handle members 40 may be adjustable in height or may be foldable to reduce the amount of space that the lawn mower 10 consumes when stored or shipped via operation of a handle adjustment assembly. The handle adjustment assembly may take many forms, but typically provides a pivot point about which the handle assembly is enabled to rotate based on operator adjustment. In some cases, the handle adjustment assembly may enable the handle assembly to be selectively rotated to a folded position, to a vertical position, and/or to a number of different operating positions at which the handle assembly may then be fixed.

The pivot point (e.g., a second pivot axis) may be provided at a handle bracket assembly that may include a handle bracket 55 and a collector bracket 70. The handle bracket 55 and the collector bracket 70 may be integrated into one unitary component, or may be provided as separate components. The handle bracket 55 may extend substantially upwardly and rearwardly from a rear portion of the blade housing 16 (e.g., proximate to the rear wheels). One handle bracket 55 may be provided proximate to each rear wheel to correspond to each respective one of the handle members 40. Furthermore, the handle brackets 55 may be on opposing sides of the door 32 and the rear discharge opening. Because the handle brackets 55 are provided outside of the rear door 32, the collector 30 may be secured without regard to the position of the handle members 40, and the handle members 40 can even be moved between operating positions or folded without necessarily impacting the collector 30 (unless desired—via connector 60, as described below). Moreover, the handle brackets 55 of some embodiments may be said to have an L-shape or a hockey stick shape as they extend upward and rearwardly. As mentioned above, the door 32 may be operably coupled to the handle bracket assembly or to the blade housing.

In an example embodiment, the blade housing 16 and the handle bracket 55 may be made of substantially the same or similar materials. For example, the blade housing 16 and the handle bracket 55 could each be made of steel, composite materials, or other sufficiently rigid and strong materials. The blade housing 16 and/or other portions of the lawn mower 10 that form a framework or structural platform upon which the components of the lawn mower 10 are assembled may be stamped, molded, welded, secured or otherwise assembled together to define a rugged and durable structure.

The handle adjustment assembly may be operable to allow the operator to select different operating positions for or otherwise fold the handle members 40, as mentioned above. Each different operating position may correspond to a different handle height for the handle members 40. However, a complete fold, or movement to an upright (or nearly upright) position are also possible. In an example embodiment, the connector 60 may be employed to operably couple a rear portion of the collector 30 to one or both of the handle members 40 (or to the cross bar). The connector 60 may be a strap or any other rigid or flexible linkage. The connector 60 may be affixed to the collector 30 and removably attachable to the handle assembly (e.g., via a snap fitting, a hook and loop fastener, a buckle assembly, and/or the like). However, other methods of operably coupling (and/or selectively operably coupling) the collector 30 to the handle assembly may also be provided.

Figure 2:
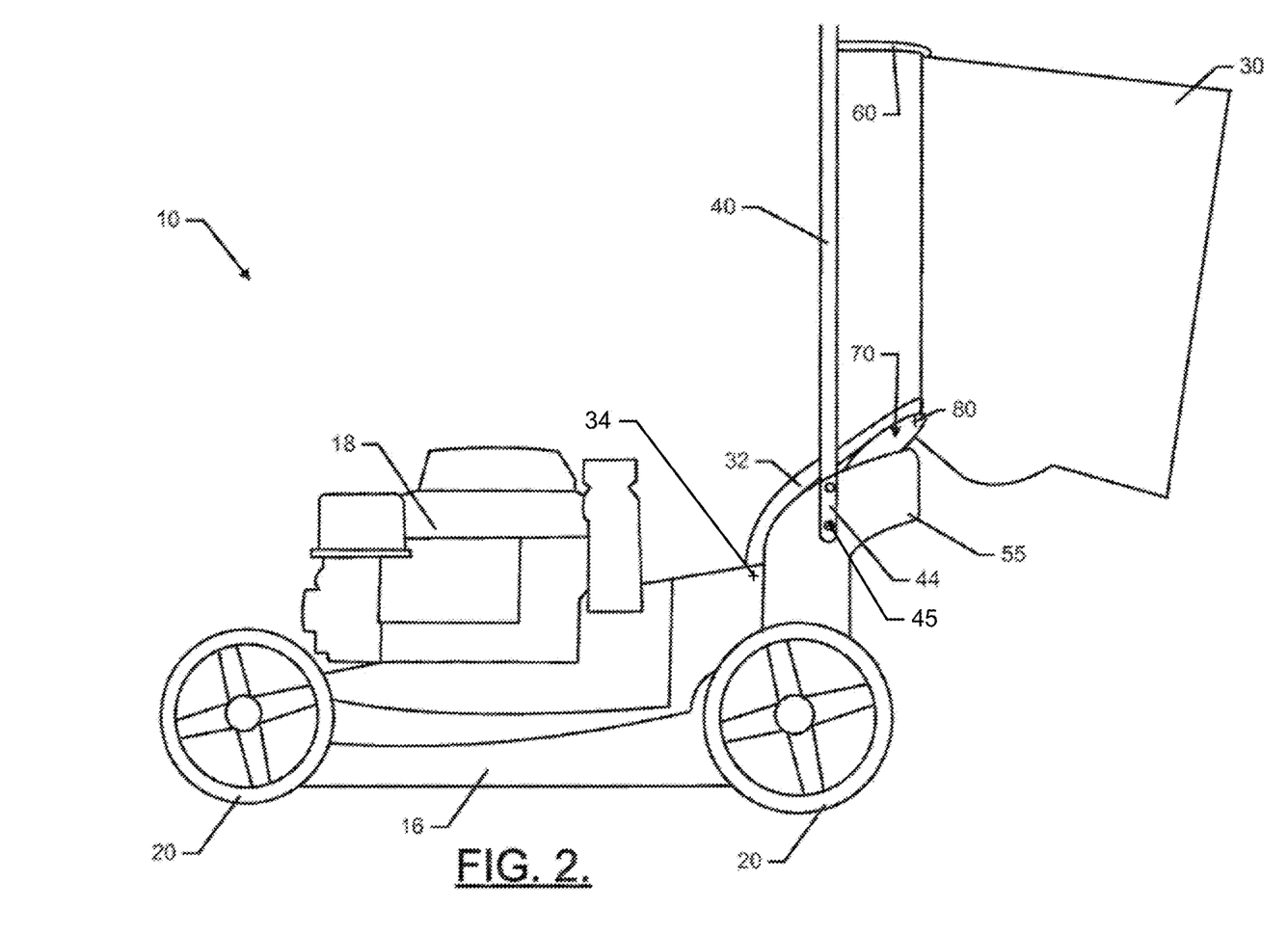
FIG. 2 illustrates a side view of the walk-behind lawn mower with the collector dump assembly pivoted to empty the collector according to an example embodiment.

When and if the connector 60 is employed, forward rotation of the handle members (e.g., in the direction of arrow 65) may cause the collector 30 to be emptied or dumped. In this regard, the collector 30 may be operably coupled to the handle brackets 55 via a collector bracket 70 that may be operably coupled to each respective one of the handle brackets 55. Thus, when the handle members 40 are rotated forward (e.g., about a third pivot axis 45) in the direction of arrow 65, the collector 30 may pivot about a pivot point 80 (e.g., the second pivot axis) that is defined at the collector brackets 70 to dump the collector 30 as shown in FIG. 2. As can be appreciated from FIGS. 1 and 2, the first, second and third pivot axes may be parallel, but non-collinear and, when viewed from the side, the third pivot axis 45 is positioned at an elevation above an elevation of the first pivot axis 34 and below an elevation of the second pivot axis at pivot point 80. Additionally, it may be appreciated from FIGS. 1 and 2, that before, after and/or during dumping of the collector 30, the door 32 is biased against the collector 30 to maintain a portion of the collector 30 substantially at the second pivot axis as the collector 30 pivots between the first position (shown in FIG. 1) and the second position (i.e., dumped, as shown in FIG. 2). However, in some cases, another component (e.g., other than the door 32) could be provided to facilitate maintaining the portion of the collector 30 substantially at the second pivot axis as the collector 30 pivots between the first and second positions.

Although the collector 30 may be dumped by tipping via connection with the handle members 40, it should also be appreciated that other dumping methods may be employed. For example, if there is no connector 60, or if the connector 60 is not engaged for operably coupling the handle members 40 to the rear portion of the collector 30 in the manner shown in FIG. 2, the collector 30 could still be tipped without any movement of the handle members 40. In this regard, for example, by the operator manually tilting the collector 30 by lifting a rear portion of the collector 30 while the handle members 40 remain in the position shown in FIG. 1, the collector 30 may be tilted to the position of FIG. 2.

Accordingly, the collector 30 can be dumped in connection with rotating the handle members 40 if the connector 60 is engaged for operably coupling the handle members 40 and the collector 30. Alternatively, the collector 30 can be dumped independent of handle position when the connector 60 is not included or not attached between the handle members 40 and the collector 30. In either case, it should be appreciated that the pivot point 80 of the collector 30 is rearward and upward relative to a pivot point of the handle members 40. Additionally, the pivot point 80 of the collector 30 is rearward and upward of the interface between the collector 30 and the rear discharge of the housing 16.

Figure 4:
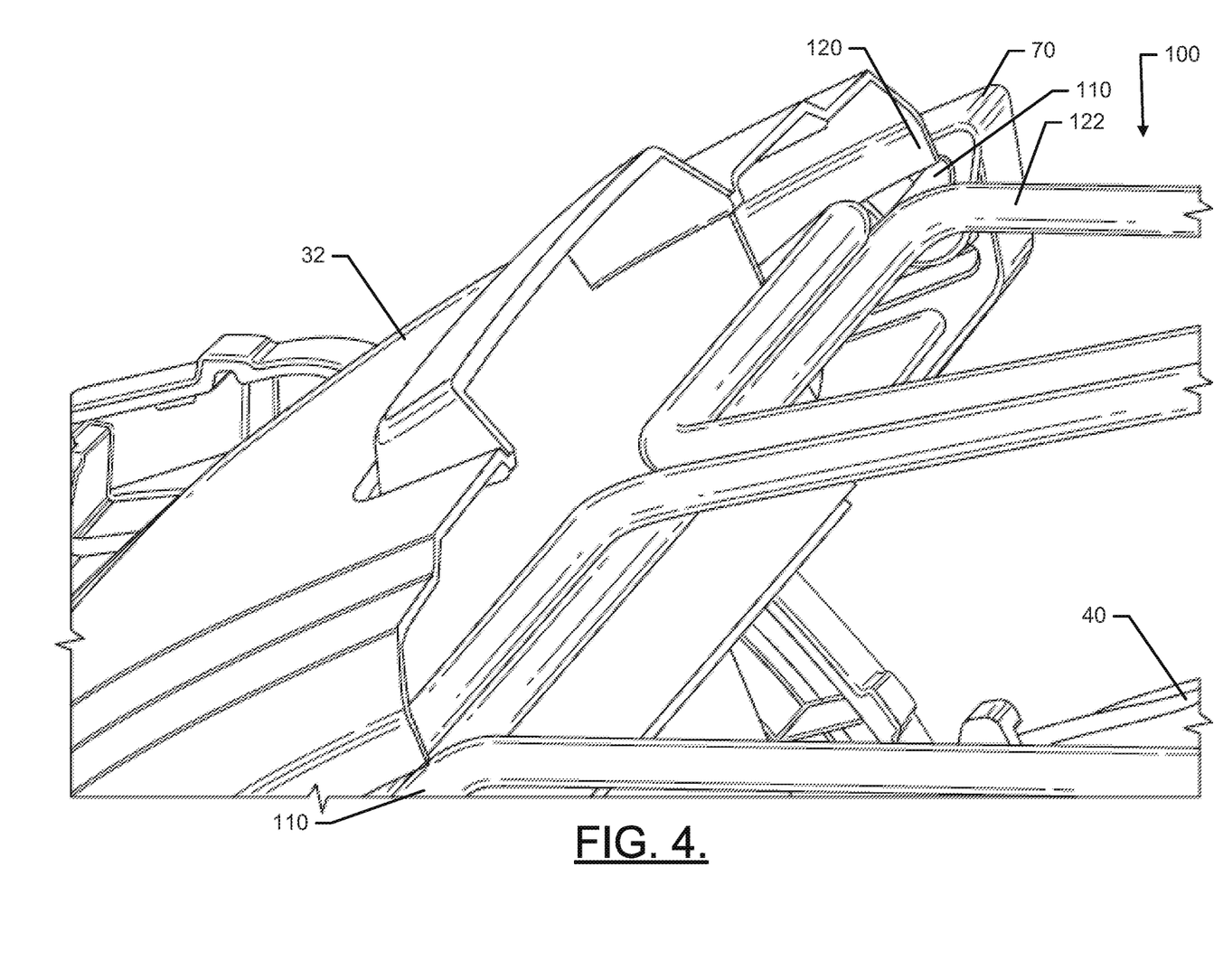
FIG. 4 illustrates a close-up view of several components associated with the collector dump assembly in accordance with an example embodiment.

The collector 30 may therefore be rotatably supported by the collector brackets 70, which are operably coupled to the handle brackets 55. In particular, in some embodiments, the collector 30 may include limb elements that extend outwardly to engage the collector brackets 70 via a receiving slot that may be positioned at the collector brackets 70 to receive the limb elements. FIG. 4 illustrates a closer view of the interface between the collector brackets 70 and the collector 30 to better illustrate how they are operably coupled with each other in accordance with an example embodiment.

In the example of FIG. 4, the external shell or skin of the collector 30 is removed. In some embodiments, the external shell or skin of the collector 30 may be made of a plastic, fabric or composite material that may define a bag or other container for receiving the clippings discharged responsive to cutting inside the housing 16. The external shell or skin may be provided around a frame 100 that may be formed from a plurality of metallic or other rigid members that form a structure giving the general shape to the collector 30. The frame 100 may generally include frame members that define the edges of the collector 30 about which the external shell or skin is wrapped to form the collector 30. In an example embodiment, the frame 100 may have collector limbs 110 that extend outwardly from opposing sides of the collector 30 to engage with the collector brackets 70. The collector limbs 110 may generally have alignment with or form the pivot point 80 since the collector limbs 110 may form the axis about which the collector 30 pivots to make the transition from the position of the collector 30 in FIG. 1 to the position of the collector 30 in FIG. 2.

In an example embodiment, a portion of the door 32 may actually rest on the collector limbs 110. Moreover, the portion of the door 32 that rests on the collector limbs 110 may fit between the other frame members of the frame 100 and the collector bracket 70. One such resting portion 120 of the door 32 is shown in FIG. 4. When lateral frame member 122 is rotated counterclockwise to dump the collector 30, the resting portion 120 is between the lateral frame member 122 and the collector bracket 70 while staying in contact with the collector limb 110. As an alternative, the door 32 may rest on the collector bracket 70 and no portion of the door 32 may contact the collector limbs 110 either when the collector 30 is in the position shown in FIG. 1 (e.g., the operating position) or when the collector 30 is in the position shown in FIG. 2 (e.g., the dumping position).

In some embodiments, the collector bracket 70 may be formed as a plastic component and the collector limb 110 may be metallic. Thus, metal to metal contact may be avoided at the interface between the collector limb 110 and the collector bracket 70. The collector bracket 70 may also be provided to define a receiving slot 140 that faces substantially upward and is therefore visible from above the lawn mower 10 looking down. The receiving slot 140 is best visible in the example of FIG. 5, which illustrates a side, perspective view of the collector bracket 70 of an example embodiment. By making the collector bracket 70 from a different material, different colors or even just the separate and distinct nature of the component may highlight the existence and visibility of the collector bracket 70. By being more visible, the collector bracket 70 (and correspondingly also the receiving slot 140) may also be recognized by the operator more readily and intuitively as the receiver and holder of the collector limb 110 on each side of the collector 30.

Figure 5:
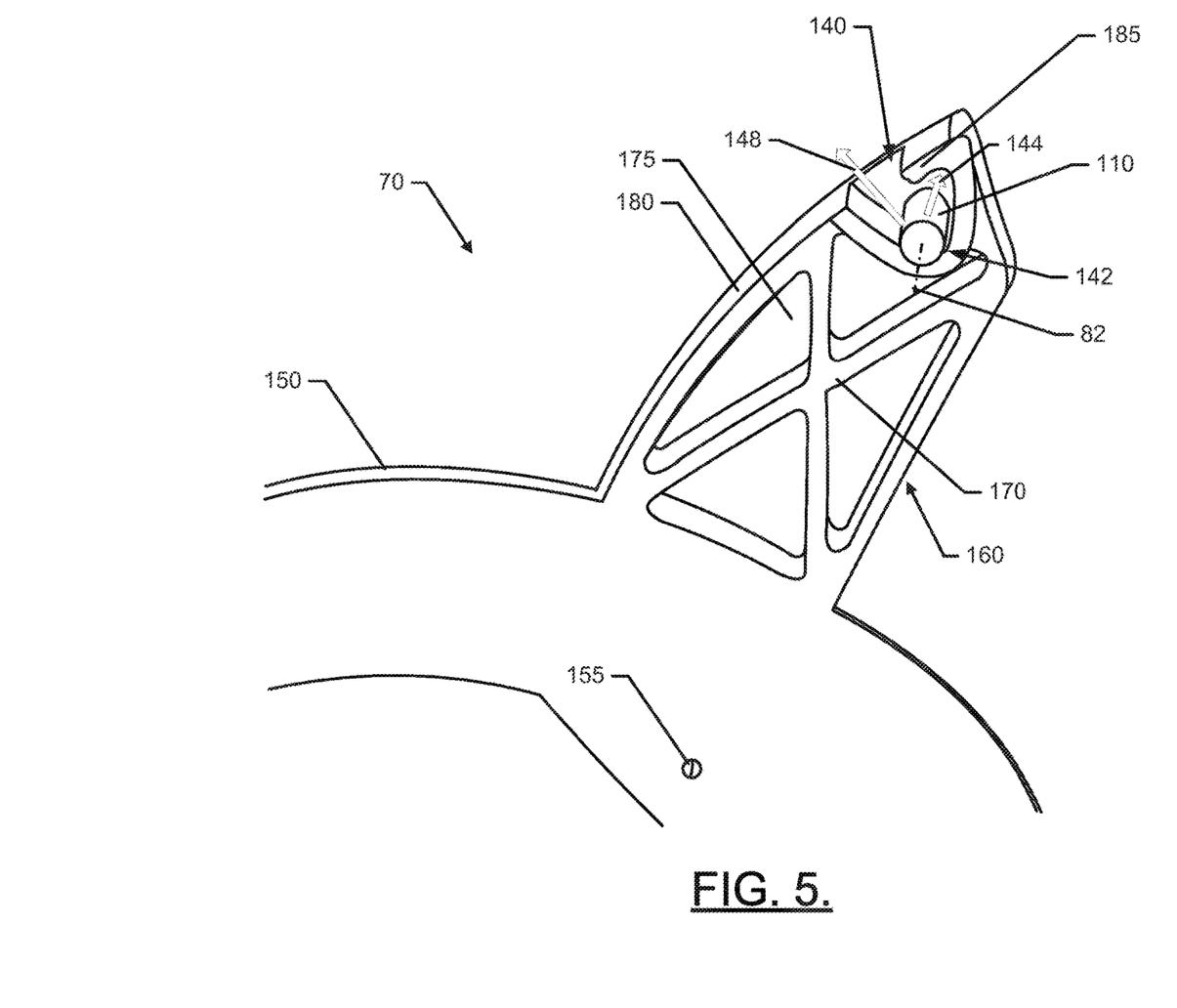
FIG. 5 illustrates a side view of a collector bracket according to an example embodiment.

As shown in FIG. 5, the collector bracket 70 may include a base portion 150 and an extension portion 160. The base portion 150 may be provided to interface with the handle bracket 55. As such, for example, the base portion 150 may be provided alongside and, in some cases, entirely inside the collector bracket 70. The base portion 150 may be operably coupled to the collector bracket 55 to fix the collector bracket 70 to the handle bracket 55. The base portion 150 may be operably coupled to the collector bracket 55 via one or more screws, rivets or other fasteners 155 that may extend through both the base portion 150 and the handle bracket 55. However, in some cases, the base portion 150 may further (or alternatively) include one or more projections that may extend into a portion of the handle bracket 55 to facilitate connection of the base portion 150 to the handle bracket 55. The fasteners 155 and/or projections may extend outwardly (e.g., away from the longitudinal centerline of the lawn mower 10) from the collector bracket 70 to the handle bracket 55.

In some embodiments, the handle bracket 55 may have a relatively thin width along its longitudinal length. The base portion 150 may be thinner than the extension portion 160 by about the width of the handle bracket 55 in some cases. However, the base portion 150 and extension portion 160 could have the same width in other examples. In an example embodiment, the extension portion 160 may have at least some material removed from interior portions thereof (e.g., to form a honeycomb-like structure) to reduce the overall material requirements and reduce the weight of the extension portion 160 without significantly sacrificing strength. Thus, as shown in FIG. 5, a plurality of support structures 170 may extend away from an end plate 175 that may define a sidewall facing outwardly relative to a longitudinal centerline of the lawn mower 10.

The extension portion 160 may extend away from the base portion 150 (and away from the handle bracket 55) in an upward and rearward direction. Thus, as can be seen from FIG. 5, the extension portion 160 may have a top surface 180 that generally faces upward (and in some cases also forward). The receiving slot 140 may be formed in the top surface 180. As such, although the receiving slot 140 may be generally opened upward, the receiving slot 140 may also be opened facing forward. The size of the opening that forms the receiving slot 140 may be large enough to receive the collector limb 110. As such, the opening that forms the receiving slot 140 may be at least larger than the diameter of the collector limb 110.

The top surface 180 may be one of the support structures 170. The support structures 170 may extend in a transverse direction substantially perpendicularly away from the end plate 175. The end plate 175 may cover an entirety of the outwardly facing side of the extension portion 160. As such, the end plate 175 may even cover the outside of the receiving slot 140. Respective opposing ends of the collector limbs 110 may therefore each sit proximate to (and lie in a parallel plane with) the end plate 175. The plane in which the end plate 175 lies may be parallel to the direction of extension of the extension portion 160.

Referring to the FIGS. 1-5, it should be appreciated that when a rear of the collector 30 is lifted or raised, there is a pivoting force exerted to cause the collector 30 to rotate about the collector limbs 110 at the pivot point 80. However, there may also be at least some lifting force that would tend to carry the collector limbs 110 rearward and upward. To ensure that such lifting force does not unseat the collector limbs 110 from the receiving slot 140, the receiving slot 140 may be configured to have a retention finger 185 disposed to extend over the collector limb 110 while the collector limb 110 is at its rest position. In this regard, the receiving slot 140 may include a substantially U-shaped (which may include V-shaped) channel to define an apex 142 at the bottom of the channel. The apex 142 may form the rest position at which the collector limb 110 rests when only gravitational forces are applied thereto. When lifting forces are applied (e.g., to move the collector limb 110 in the direction of arrow 144), the collector limb 110 may ride upward and rearward, but will be retained in the receiving slot 140 by the retention finger 185. Thus, the pivot point (or pivot axis 82) may actually move somewhat along a rear portion of the receiving slot 140 as the collector limb 110 rides between the rest position and contact with the retention finger 185. However, when the operator intends to deliberately remove the collector 30 from the lawn mower 10, the operator can easily remove the collector limbs 110 through the receiving slots 140 in each respective collector bracket 70 by moving the collector 30 slightly forward while also lifting upward to follow the path shown by arrow 148.

Although the receiving slot 140 separates the top sloped surface 180 into two otherwise continuous portions (one of which is the retention finger 185 proximate to the distal end of the top sloped surface 180), it should be appreciated that the top sloped surface 180 need not necessarily have a smooth surface over its full length. In other words, although the retention finger 185 essentially appears as a continuation of the top sloped surface 180, it is not necessary that such continuity be provided. Instead, the retention finger 185 could be provided with a different shape and could even appear to be at a different angle than the top sloped surface 180. As such, the retention finger 185 is only required (in some embodiments) to extend forward at least so that the retention finger 185 extends over the collector limb 110 when the collector limb 110 is at the rest position. Thus, for example, the retention finger 185 may extend from a position rearward of the rearmost edge of the collector limb 110 when the collector limb 110 is at the rest position, forward toward the farthest forward edge of the collector limb 110 to a point at least above the farthest forward edge or between the farthest forward edge and a vertical plane passing through the longitudinal centerline of the collector limb 110.

Accordingly, a lawn mower of an example embodiment may include a blade housing configured to house at least one blade, engine operably coupled to the blade housing and configured to selectively rotate the at least one blade, a handle bracket assembly operably coupled to the blade housing, a handle assembly operably coupled to the handle bracket assembly, a door operably coupled to the handle bracket assembly and configured to pivot about a first pivot axis and a collector operably coupled to the handle bracket assembly and configured to pivot about a second pivot axis between a first position and a second position. In the first position, the collector is configured to receive clippings generated responsive to operation of the at least one blade. In the second position, the collector is configured to dump the clippings from the collector. The door is biased against the collector to maintain a portion of the collector substantially at the second pivot axis as the collector pivots between the first position and the second position. The handle bracket assembly may include handle brackets disposed at the blade housing proximate to the rear discharge to support the handle assembly, and collector brackets. The collector brackets may be disposed at corresponding ones of the handle brackets to receive collector limbs extending from respective opposing sides of the collector. The collector bracket may each include a receiving slot defining a rest position for a corresponding one of the collector limbs, and a retention finger extending above at least a portion of the corresponding one of the collector limbs in the rest position.

In some embodiments, the features described above may be augmented or modified, or additional features may be added. These augmentations, modifications and additions may be optional and may be provided in any combination. Thus, although some example modifications, augmentations and additions are listed below, it should be appreciated that any of the modifications, augmentations and additions could be implemented individually or in combination with one or more, or even all of the other modifications, augmentations and additions that are listed. As such, for example, the retention finger may extend from a rear portion of one of the collector brackets forward toward the receiving slot. In an example embodiment, the collector brackets may each include a top surface in which the receiving slot is formed such that the receiving slot is visible from above the lawn mower. In some cases, the receiving slot may open forward and upward through the top surface. In some embodiments, the receiving slot may include a U-shaped or V-shaped channel defining an apex, and the rest position may be defined at the apex. In an example embodiment, the U-shaped or V-shaped channel may be formed by support structures extending substantially perpendicularly away from an end plate forming an external sidewall of each of the collector brackets. In some cases, each of the collector brackets may include a base portion operably coupled to a respective handle bracket, and an extension portion may be operably coupled to the corresponding one of the collector limbs. In some embodiments, the extension portion may extend away from the base portion upwardly and rearwardly. In an example embodiment, the extension portion may include an end plate extending over an entirety of an outer side of the extension portion. In such an example, a width of the extension portion may be defined by transversely extending support structures. At least one of the transversely extending support structures may form a top surface of the extension portion, and the receiving slot may be formed in a portion of the top surface. In some cases, the collector limbs may extend across a transverse direction of the lawn mower, and ends of the collector limbs may fit between end plates of the collector brackets. In an example embodiment, the collector may be operably coupled to the handle assembly via a strap or connector, such that rotation of the handle assembly causes the collector to pivot about a pivot point defined at the collector brackets to enable the collector to be emptied. In some cases, the collector may be rotatably supported by the collector brackets, such that the collector is enabled to pivot about a pivot point defined at the collector brackets to enable the collector to be emptied. As such, for example, the collector may be enabled to pivot about the pivot point without movement of a door hingedly connected to the blade housing to cover the rear discharge when the collector is removed. In some cases, the door may rest on the collector limbs while the collector pivots about the pivot point. In some cases, the handle assembly may be configured to pivot about a third pivot axis, and the collector may be operably coupled to the handle assembly via a connector, such that pivoting of the handle assembly about the third pivot axis causes the collector to pivot about the second pivot axis from the first position to the second position. In some embodiments, the collector is enabled to pivot about the second pivot axis without movement of the door when the collector is pivoted from the first position to the second position. In an example embodiment, the door may be biased against a top frame of the collector to maintain collector limbs of the collector substantially at the second pivot axis as the collector pivots between the first position and the second position. In some cases, first, second, and third pivot axes are parallel to each other, but not collinear. In an example embodiment, when viewed from a side of the lawn mower, the third pivot axis is positioned at an elevation above the first pivot axis and below an elevation of the second pivot axis. In some embodiments, each of the collector brackets is mounted to and extends above a corresponding one of the handle brackets. In some cases, the door may be biased against a top frame of the collector to maintain collector limbs of the collector substantially at the second pivot axis as the collector pivots between the first position and the second position.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A lawn mower comprising:
a blade housing configured to house at least one blade;
an engine operably coupled to the blade housing and configured to selectively rotate the at least one blade;
a handle bracket assembly operably coupled to the blade housing;
a handle assembly operably coupled to the handle bracket assembly;
a door operably coupled to the handle bracket assembly and configured to pivot about a first pivot axis; and
a collector operably coupled to the handle bracket assembly and configured to pivot about a second pivot axis between a first position and a second position;
wherein, in the first position, the collector is configured to receive clippings generated responsive to operation of the at least one blade;

wherein, in the second position, the collector is configured to dump the clippings from the collector;
wherein the door is biased against the collector to maintain a portion of the collector substantially at the second pivot axis as the collector pivots between the first position and the second position;
wherein the handle bracket assembly comprises:
handle brackets disposed at the blade housing proximate to a rear discharge to support the handle assembly; and
collector brackets disposed at corresponding ones of the handle brackets to receive collector limbs extending from respective opposing sides of the collector; and wherein the collector brackets each comprise:
a receiving slot defining a rest position for a corresponding one of the collector limbs, and
a retention finger extending above at least a portion of the corresponding one of the collector limbs in the rest position.

2. The lawn mower of claim 1, wherein the retention finger extends from a rear portion of one of the collector brackets forward toward the receiving slot.

3. The lawn mower of claim 1, wherein the collector brackets each comprise a top surface in which the receiving slot is formed such that the receiving slot is visible from above the lawn mower.

4. The lawn mower of claim 3, wherein the receiving slot opens forward and upward through the top surface.

5. The lawn mower of claim 1, wherein the receiving slot comprises a U-shaped channel defining an apex, and wherein the rest position is defined at the apex.

6. The lawn mower of claim 5, wherein the U-shaped channel is formed by support structures extending substantially perpendicularly away from an end plate forming an external sidewall of each of the collector brackets.

7. The lawn mower of claim 1, wherein each of the collector brackets comprises a base portion operably coupled to a respective handle bracket, and an extension portion operably coupled to the corresponding one of the collector limbs.

8. The lawn mower of claim 7, wherein the extension portion extends away from the base portion upwardly and rearwardly.

9. The lawn mower of claim 7, wherein the extension portion comprises an end plate extending over an entirety of an outer side of the extension portion, wherein a width of the extension portion is defined by transversely extending support structures, at least one of the transversely extending support structures forming a top surface of the extension portion, and wherein the receiving slot is formed in a portion of the top surface.

10. The lawn mower of claim 1, wherein the collector limbs extend across a transverse direction of the lawn mower, and wherein ends of the collector limbs fit between end plates of the collector brackets.

11. The lawn mower of claim 1, wherein the collector is enabled to pivot about the second pivot axis without movement of the door when the collector is pivoted from the first position to the second position.

12. The lawn mower of claim 11, wherein the door rests on the collector limbs while the collector pivots about the second pivot axis.

13. The lawn mower of claim 1, wherein each of the collector brackets is mounted to and extends above a corresponding one of the handle brackets.

14. A lawn mower comprising:
a blade housing configured to house at least one blade;
an engine operably coupled to the blade housing and configured to selectively rotate the at least one blade;
a handle bracket assembly operably coupled to the blade housing;
a handle assembly operably coupled to the handle bracket assembly;
a door operably coupled to the handle bracket assembly and configured to pivot about a first pivot axis; and
a collector operably coupled to the handle bracket assembly and configured to pivot about a second pivot axis between a first position and a second position;
wherein, in the first position, the collector is configured to receive clippings generated responsive to operation of the at least one blade;
wherein, the second position, the collector is configured to dump the clippings from the collector;
wherein the door is biased against the collector to maintain a portion of the collector substantially at the second pivot axis as the collector pivots between the first position and the second position; and
wherein the handle assembly is configured to pivot about a third pivot axis, and wherein the collector is operably coupled to the handle assembly via a connector, such that pivoting of the handle assembly about the third pivot axis causes the collector to pivot about the second pivot axis from the first position to the second position.

15. The lawn mower of claim 14, wherein the first, second, and third pivot axes are parallel to each other, but not collinear.

16. The lawn mower of claim 14, wherein, when viewed from aside of the lawn mower, the third pivot axis is positioned at an elevation above an elevation of the first pivot axis and below an elevation of the second pivot axis.

17. A lawn mower comprising:
a blade housing configured to house at least one blade;
an engine operably coupled to the blade housing and configured to selectively rotate the at least one blade;
a handle bracket assembly operably coupled to the blade housing;
a handle assembly operably coupled to the handle bracket assembly;
a door operably coupled to the handle bracket assembly and configured to pivot about a first pivot axis; and
a collector operably coupled to the handle bracket assembly and configured to pivot about a second pivot axis between a first position and a second position;
wherein, in the first position, the collector is configured to receive clippings generated responsive to operation of the at least one blade;
wherein, in the second position, the collector is configured to dump the clippings from the collector;
wherein the door is biased against the collector to maintain a portion of the collector substantially at the second pivot axis as the collector pivots between the first position at the second position; and
wherein the door is biased against a top frame of the collector to maintain collector limbs of the collector substantially at the second pivot axis as the collector pivots between the first position and the second position.

18. A collector dump assembly for dumping a collector attachable to a lawn mower, the collector dump assembly comprising:
a handle bracket assembly operably coupled to a blade housing, a door, and a handle assembly of the lawn mower, the door being configured to pivot about a first pivot axis;

a collector operably coupled to the handle bracket assembly and configured to pivot about a second pivot axis between a first position and a second position;

wherein, in the first position, the collector is configured to receive clippings generated responsive to operation of the at least one blade;

wherein, in the second position, the collector is configured to dump the clippings from the collector;

wherein the door is biased against the collector to maintain a portion of the collector substantially at the second pivot axis as the collector pivots between the first position and the second position;

wherein the handle bracket assembly comprises:
- a pair of handle brackets disposed at the blade housing that houses a blade that rotates in a plane substantially parallel to the ground, the pair of handle brackets being disposed proximate to and on opposing sides of a rear discharge of the blade housing, the pair of handle brackets supporting respective handle members of the handle assembly for guiding operation of the lawn mower by an operator walking substantially behind the lawn mower; and
- a pair of collector brackets disposed at respective ones of the handle brackets to receive collector limbs extending from respective opposing sides of the collector, wherein each of the collector brackets comprises:
- a receiving slot defining a rest position for a corresponding one of the collector limbs, and
- a retention finger extending above at least a portion of the corresponding one of the collector limbs in the rest position.

* * * * *